(12) United States Patent
Hamann et al.

(10) Patent No.: US 8,435,583 B2
(45) Date of Patent: May 7, 2013

(54) FRENCH FRY PRODUCTION METHOD WITH REDUCED CRUMB GENERATION

(75) Inventors: Michael L. Hamann, Caldwell, ID (US); David N. Gallina, Nampa, ID (US); David B. Walker, Meridian, ID (US); Stephen L. O'Bannon, Caldwell, ID (US); Bruce T. Pittard, Caldwell, ID (US)

(73) Assignee: J.R. Simplot Company, Boise, ID (US)

( * ) Notice: Subject to any disclaimer, the term of this patent is extended or adjusted under 35 U.S.C. 154(b) by 742 days.

(21) Appl. No.: 11/770,130

(22) Filed: Jun. 28, 2007

(65) Prior Publication Data

US 2008/0008797 A1   Jan. 10, 2008

Related U.S. Application Data

(60) Provisional application No. 60/806,658, filed on Jul. 6, 2006, provisional application No. 60/826,503, filed on Sep. 21, 2006.

(51) Int. Cl.
*A23L 1/24* (2006.01)

(52) U.S. Cl.
USPC .................. 426/438; 426/637; 426/441

(58) Field of Classification Search .................. 426/438, 426/441, 637
See application file for complete search history.

(56) References Cited

U.S. PATENT DOCUMENTS

| | | | |
|---|---|---|---|
| 3,617,543 A * | 11/1971 | Smith | ............................ 210/785 |
| 3,934,046 A | 1/1976 | Weaver et al. | |
| 4,456,624 A | 6/1984 | Glantz | |
| 5,242,699 A | 9/1993 | Bednar et al. | |
| 6,042,870 A | 3/2000 | Walsh et al. | |
| 6,117,463 A | 9/2000 | Alexander et al. | |
| 6,228,405 B1 * | 5/2001 | Walsh et al. | ................... 426/241 |
| 6,969,534 B2 | 11/2005 | Benson et al. | |
| 7,108,878 B2 | 9/2006 | Tiffany et al. | |
| 2002/0160084 A1 | 10/2002 | Benson et al. | |
| 2006/0045955 A1 | 3/2006 | Thorpe et al. | |
| 2006/0045956 A1 | 3/2006 | Thorpe et al. | |

FOREIGN PATENT DOCUMENTS

WO   2006026085 A   3/2006

OTHER PUBLICATIONS http://www.toledoblade.com/apps/pbcs.dll/article?AID=/20051205/NEWS32/512030320; Trans fat: 'Zero' foods add up Experts say manufacturers should have to list even traces of the substance; by Luke Shockman Blade Staff Writer; Article published Dec. 5, 2005.*
http://dictionary.reference.com/browse/frying; Jan. 19, 2010.*
Seifen; Lipid-Fett; vol. 88 Issue 2, pp. 48-52; 1985.*

* cited by examiner

*Primary Examiner* — Patricia George
(74) *Attorney, Agent, or Firm* — Lowry Blixseth LLP; Stuart O. Lowry; Scott M. Lowry

(57) ABSTRACT

An improved production process for preparing parfried and frozen French fry potato products with reduced crumb generation particularly upon finish preparation as by finish frying. Potato products such as French fry strips are cut, blanched and parfried, followed by a water treatment step as by applying a light spray or mist of water at ambient temperature and preferably at a rate selected to avoid any substantial overspray. The potato products are frozen for shipment and/or storage awaiting finish preparation. Upon finish preparation as by finish frying in hot oil, the potato products exhibit substantially reduced crumb generation. The improved process is particularly useful when parfrying and/or finish frying the potato products in a liquid or substantially non-hydrogenated oil, such as a zero grams Trans Fat (ZGTF) oil, with dramatically reduced crumb generation upon finish fry preparation while retaining a substantially optimized balance of sensory characteristics.

20 Claims, No Drawings

FRENCH FRY PRODUCTION METHOD WITH REDUCED CRUMB GENERATION

BACKGROUND OF THE INVENTION

This invention relates generally to an improved process for preparing parfried and frozen potato products such as elongated French fry strips. More specifically, this invention relates to an improved production process for preparing parfried and frozen French fry potato products which exhibit substantially reduced crumb generation when finish prepared particularly as by finish fry preparation. The improved process is especially suited for parfrying and/or finish frying the potato products in an oil that is liquid (at room temperature) or substantially non-hydrogenated oil, such as a zero grams Trans Fat (ZGTF) oil, with dramatically reduced crumb generation while producing a finished product characterized by a highly desirable combination of taste, appearance and textural attributes.

Parfried and frozen potato products, such as elongated French fry strips, are widely available in the foods industry. These potato products are conventionally prepared by cutting whole potatoes into elongated strips of a desired size and shape, and then partially cooking the potato strips by blanching in hot water or steam. Thereafter, the potato strips are typically dewatered or partially dried, followed by partial frying, or parfrying, in hot cooking oil. The parfried potato strips are then frozen for packaging, shipping and/or storage. Prior to consumption, the parfried and frozen potato strips are reconstituted or finish prepared typically by finish frying in hot oil. French fried potato strips of this type are utilized extensively in restaurant and food service operations, and particularly in so-called fast food restaurants wherein it is desirable to produce a finish cooked product with a substantially optimized set of quality characteristics and with a relatively short finish fry preparation time. Further details of an exemplary French fry production process are described in U.S. Pat. No. 3,397,993, which is incorporated by reference herein.

More specifically, one major objective of potato processors is to provide parfried and frozen potato strips which can be finish prepared with a combination of taste, color, odor, and textural attributes selected for substantially optimum consumer palatability. For example, it is highly desirable to provide parfried and frozen potato strips which, after finish preparation, exhibit a light and tender but crispy exterior surface of golden brown fried color encasing a soft and mealy interior which is neither too dry nor too soggy. Moreover, especially in a fast food restaurant environment, it is important to provide finish cooked potato strips which can consistently retain these desired sensory qualities for an extended holding period of at least several minutes before actual consumption. In the past, achieving these desirable product qualities on a consistent basis has generally required that the potato strips be finish prepared by frying in hot oil. In a fast food establishment, to avoid advance preparation of potato strips that might not be sold or served within a limited holding time of several minutes, a relatively short finish fry step is desired and is typically on the order of about 1.5-3.5 minutes for smaller so-called shoestring size cut strips and about 3-4 minutes for larger strips cut sizes.

Generation of small crumbs particularly within the finish fry oil during finish fry strip preparation is a potentially major problem faced by a restaurant or food service operator. In this regard, it is generally known that a quantity of small crumbs is produced during finish frying, wherein these crumbs may tend to float within the hot finish fry oil. If allowed to accumulate, these crumbs can foul the oil and can adhere to the potato strips in a quantity and manner that detracts from the finish-prepared product.

The magnitude of crumb generation appears to be related to the type of cooking oil used for parfrying and/or for finish frying the potato strips. That is, with traditional hydrogenated or partially hydrogenated or highly saturated cooking oils which are solid or semi-solid at room temperature, crumb generation appears to be relatively moderate whereby routine oil filtering is normally sufficient to limit crumb accumulation to an acceptably low level. In a typical fast food restaurant, routine oil filtering has normally involved filtering of the cooking oil once each day. However, these traditional hydrogenated or partially hydrogenated and saturated cooking oils include fat constituents known as Trans Fats and saturated fats which do not meet the dietary standards and preferences of many modern consumers. As a result, significant interest has developed in liquid (at room temperature), substantially non-hydrogenated cooking oils referred to generally as zero grams Trans Fat (ZGTF) oils for producing French fried potato strips. See, e.g., U.S. Publication 2004/0146626 (now U.S. Pat. No. 7,169,430), which is also incorporated by reference herein, for an exemplary ZGTF oil. But when used for French fry production, these ZGTF oils are accompanied by dramatically increased generation of crumbs during the finish fry step. Routine (once per day) filtering of the finish fry oil is unable to prevent crumb accumulation to an unacceptably high magnitude. Instead, it is necessary for the restaurant or food service personnel to filter or skim accumulated crumbs from the finish fry oil on a frequent schedule, approximately 1-2 times per hour, following a small number of cooking cycles. Historically, requiring such labor-intensive activity and/or a change in finish fry procedures at the restaurant or food service operator facility is highly undesirable, and results at best in a finish-prepared product of inconsistent quality characteristics.

The reasons for crumb generation, and the differential rates of crumb generation for different types of cooking oils, are not well understood. Some have theorized that crumbs are produced during parfrying, wherein crumb accumulation in the finish fry oil can be reduced by separating generated crumbs from the parfried strips before freezing. In this regard, post-parfry water wash systems of the type used in the past for washing and recovering excess oil from the parfried strips have been suggested for crumb control use. These post-parfry water wash systems have utilized a heated and relatively high volume water or steam overspray, sometimes in combination with an air spray, to scrub oil from the outer surfaces of the parfried strips. The combined water-oil effluent is then subjected to a separator step to recover and recycle the oil. When used for crumb control, these post-parfry water wash systems have demonstrated a substantial reduction in crumb generation rate, but they have also been accompanied by a substantial deterioration in product quality characteristics after finish frying. In addition, such water wash systems significantly increase overall French fry production complexity which can have a negative impact on costs.

Despite this crumb generation issue, there is a strong trend in the foods industry to move toward wide-scale adoption of ZGTF oils for parfrying and finish frying French fry potato products, such as French fry strips. Accordingly, there exists a strong need for an improved French fry production process which can effectively and economically reduce and control crumb generation without adversely impacting product quality characteristics after finish frying. Moreover, there exists a need for implementation of such improved process at a production facility, in the course of parfrying and freezing the potato strips, so that the restaurant or food service operator can finish prepare high quality French fry products without requiring any change in normal finish fry procedures. The present invention fulfills all of these needs, and provides further related advantages.

SUMMARY OF THE INVENTION

In accordance with the invention, an improved production process is provided for preparing parfried and frozen French fry potato products such as French fry potato strips with reduced crumb generation particularly upon finish preparation as by finish frying. The improved process is particularly suited for, but not limited to, use of a liquid or substantially non-hydrogenated oil, such as a zero grams Trans Fat (ZGTF) oil. Parfried potato strips are subjected to a surface water treatment step as by applying a light spray or mist of water, preferably at ambient or a relatively cool temperature, and preferably at a rate selected to avoid any substantial overspray. The potato strips are then frozen for shipment and/or storage awaiting finish preparation. Upon finish preparation as by finish frying in hot oil, the surface-treated potato strips exhibit substantially reduced crumb generation.

In one preferred form, French fry potato strips are cut from raw peeled or unpeeled potatoes with a selected cross sectional size and shape, such as so-called shoestring size potato strips having a substantially square-cut cross sectional shape with cut side dimensions of about 0.30 by about 0.30 inch. These cut potato strips are subjected to a conventional blanch step in hot water or steam, and then typically dewatered or partially dried followed by partial frying, or parfrying, in hot oil for a selected time and at a selected temperature. The parfry oil may comprise any known cooking oil, although the invention is believed to be particularly useful with a liquid (at room temperature), substantially non-hydrogenated oil such as a ZGTF oil.

After parfrying, the potato strips are conveyed through a water treatment station whereat the exterior surfaces of the parfried strips are subjected to a spray of water preferably at a relative cool or ambient temperature and preferably at a rate selected to avoid any substantial overspray. In one preferred form, the water spray is applied to the parfried strips as a light mist at a water temperature within the range of from about 55 to about 85 F., and at a flow rate sufficient to hydrate the outer surfaces of the parfried strips to achieve an overall strip weight increase of about 1% to about 11%, and more preferably on the order of about 2% to about 8%. The thus-treated parfried strips are then conveyed with a controlled cool-down time delay to a freezer such as a blast freezer at about −20 F. for quickly freezing the strips. The frozen strips are then packaged for appropriate shipment and/or storage awaiting finish preparation at a restaurant or food service operator facility or the like.

The water-treated and frozen parfried potato strips are finish prepared as by finish frying in hot oil, such as a ZGTF oil, for a selected time and at a selected temperature. Crumb generation within the finish fry oil is substantially eliminated. In addition, by comparison with a control product which has not been subjected to the post-parfry water treatment step, the finish fried potato strips of the present invention surprisingly and unexpectedly exhibit substantially comparable high quality sensory characteristics, including high quality appearance, aroma, flavor, and texture traits.

In accordance with further aspects of the invention, the post-parfry water treatment step may be used to impart and/or to enhance desirable characteristics to the potato strips, upon finish preparation thereof as by finish frying in hot oil. In this regard, a broad range of water soluble constituents such as flavor additives, texture modifiers, nutrition enhancers, fat level modifiers, and/or appearance modifying agents may be incorporated into the water applied to the parfried strips at the water treatment station for controllably modifying and/or regulating one or more of these sensory characteristics. Anti-microbial agents such as peroxyacetic acid and/or anti-yeast or anti-mold agents such as octanoic acid may also be incorporated in trace amounts in the water applied to the parfried strips at the water treatment station.

In a further alternative form of the invention, the cut potato strips can be subjected to a batter coating step wherein an aqueous-based batter is applied to the potato strips before parfrying. In yet another alternative form, the potato products may comprise a formed product such as so-called potato gems formed by consolidating small chunks, strips or slices into a cohesive unit before parfrying. Such batter coated and formed products are also beneficially treated by water addition at the water treatment station to result in a French fried potato product wherein crumb generation is substantially eliminated upon finish fry preparation. In addition, it has been found that the water treatment step may optionally occur subsequent to freezing of the parfried potato products.

Other features and advantages of the invention will become more apparent from the following detailed description.

DETAILED DESCRIPTION OF THE PREFERRED EMBODIMENT

The present invention relates to an improved production process for preparing parfried and frozen French fry potato products, such as elongated potato strips with reduced crumb generation particularly upon finish preparation as by finish frying. The invention is particularly designed for reducing crumb generation upon finish fry preparation of the potato strips in a liquid (at room temperature) or substantially non-hydrogenated oil, commonly referred to as a zero grams Trans Fat (ZGTF) oil. According to the invention, and in accordance with one preferred form, parfried potato products are exposed to a water treatment step as by applying a light spray or mist of water, preferably at ambient or a relatively cool temperature, and preferably at a rate selected to avoid any substantial overspray, followed by strip freezing for packaging, shipment and/or storage. Upon finish preparation as by finish frying, crumb generation within the finish fry oil is dramatically reduced.

The improved process of the present invention is applicable to a broad range of different French fry potato product shapes, sizes and specific processing parameters, including but not limited to elongated French fry strips, batter-coated French fry strips, and formed French fry products such as so-called gems, and the like. In addition, the inventive process yields significant crumb reduction irrespective of the specific type of cooking oil used for parfrying and/or finish frying the potato strips. In this regard, while the inventive process is especially suited for use with non-hydrogenated or ZGTF cooking oils wherein crumb development represents a particular problem, it will be appreciated that the inventive process is equally applicable to achieve reduced crumb generation when other types of cooking oils are used, such as a traditional hydrogenated or partially hydrogenated or saturated fat cooking oil.

In the preferred form, French fry potato products in the form of elongated cut potato strips are conventionally prepared by cutting whole potatoes in a raw and typically peeled state into elongated strips having selected and typically rectangular cross sectional dimensions and a selected length distribution range. For example, traditional so-called shoestring cut French fry potato strips as used widely in fast food restaurants have a generally square cross sectional shape with each side measuring about 0.3 inches in width, and a length distribution ranging from about 2-6 inches. French fry potato strips of this cut style are typically processed to a parfried and frozen state for packaging and shipment to a food service facility where they are normally finished prepared by frying in hot oil immediately prior to serving to consumers. In this regard, over a period of years, consumers have learned to recognize and expect such French fry potato strips to exhibit a certain set of taste, texture, color, and other quality characteristics, such as a light and tender but crispy exterior surface encasing a soft and mealy interior which is neither too dry nor too soggy.

Such parfried and frozen potato strips are conventionally processed at a production facility by subjecting the raw cut strips to an initial partial cooking step such as blanching in hot water or steam. The blanched strips are then drained of excess water and, in accordance with one preferred process as described in U.S. Pat. No. 3,397,993, subjected to a brief drying step for controlled reduction in strip moisture content. In many processes, prior to the drying step, the strips are dipped into or sprayed with a dextrose-based solution which may also include sodium acid pyrophosphate (SAPP) for enhanced browning color development during subsequent frying. In some processes, the potato strips are also surface-coated as by dipping or spraying with a batter typically such as an aqueous starch based batter composition.

These blanched potato strips are parfried in hot oil followed by freezing and packaging for shipment and/or storage. In this regard, it is not uncommon for the parfried and frozen potato strips to be retained in a frozen state for several weeks or months prior to finish preparation at a restaurant facility of the like for serving to consumers. For potato strips intended for conventional finish preparation by finish frying in hot oil, the strips typically exhibit a moisture content of about 60%-70% by weight in the parfried and frozen state. Such potato strips are exemplified by those available at McDonald's restaurants.

In the past, the cooking oil used for the parfry and finish fry steps has comprised a hydrogenated or partially hydrogenated or high saturated fat cooking oil which is normally solid or semi-solid at room temperature. Such cooking oils have produced finish prepared potato strips exhibiting a substantially optimized, high quality set of sensory characteristics, including appearance, aroma, flavor, and texture. However, such cooking oils include fat constituents known as Trans Fats which do not meet the dietary standards and preferences of many modern consumers. As a result, significant interest has developed in liquid (at room temperature), substantially non-hydrogenated cooking oils referred to generally as zero grams trans fat (ZGTF) oils for producing French fried potato strips. See, e.g., U.S. Publication 2004/0146626 (now U.S. Pat. No. 7,169,430), for an exemplary ZGTF oil. But when used for French fry production, these ZGTF oils are accompanied by dramatically increased generation of crumbs during the finish fry step.

While the reasons for crumb generation, and the significant increase in crumb generation rate with ZGTF oils are not well understood, it has been found that a post-parfry surface treatment step wherein a preferably light or low volume of water is applied as by dipping or spraying to hydrate the exterior surfaces of the parfried strips yields a surprising and unexpected reduction in crumb generation without adversely affecting quality characteristics of the finish prepared potato strips. This post-parfry water treatment step, in the preferred form, uses relatively cool or ambient temperature water, preferably with a volumetric or mass flow rate sufficiently low to avoid any substantial water overspray. Water pick-up on the surfaces of the parfried strips is relatively minimal, preferably within the range of about 1% to about 11% by weight, and more preferably within the range of about 2% to about 8% by weight. The surface-hydrated parfried strips are then frozen, followed by appropriate packaging for shipment and/or storage awaiting finish preparation. Upon finish fry preparation in hot oil, such as a ZGTF oil, crumb generation within the finish fry oil is dramatically reduced and substantially eliminated.

In one preferred and exemplary form of the invention, elongated shoestring size potato strips are cut to a desired size and shape from raw whole peeled and trimmed potatoes, such as Russet Burbank, Shepody, or other potato varieties used commonly in the production of parfried and frozen French fry potato strips. Specifically, these potatoes are cut into strips of generally square cross sectional shape with the width of each cut strip side on the order of about 0.29-0.30 inch. The lengths of the cut potato strips vary according to the size of the potatoes being cut, with a typical length ranging from about 1 inch to about 6 inches. The cut strips prepared as described desirably have a length distribution of at least about 30% having a length exceeding three inches, and not more than about 20% having a length less than two inches. These raw potato strips have a solids content on the order of about 20-22% by weight, and thus a corresponding moisture content on the order of about 78-80% by weight.

These raw-cut shoestring potato strips are partially cooked by water blanching in hot water or steam, such as blanching at approximately 155-200° F. for about 2-15 minutes. In one example, the cut potato strips are blanched in hot water at about 170° F. for about 4-5 minutes, and then blanched a second time in hot water at about 180° F. for about 3-4 minutes, with the blanch times and/or blanch temperatures adjusted appropriately so that the blanched strips have a reduced level of dextrose and an even and acceptable texture.

Following these water blanch steps, the strips may be dipped briefly into a water-based dip solution having a temperature of about 160 F. for about 30 seconds. One preferred dip solution includes about 0.3% weight dextrose, about 1.0% weight salt, about 0.4% weight sodium acid pyrophosphate (SAPP), about 1.2% weight tetra sodium pyrophosphate (TSPP). The thus-treated blanched and dipped potato strips are then subjected to a dry step to achieve a strip weight loss on the order of about 20-30%, as described in U.S. Pat. No. 3,397,993.

The blanched and partially dried potato strips are then subjected to a single parfry step in hot oil, such as a ZGTF oil at a substantially normal parfry oil temperature and a substantially normal parfry time. In the preferred form, the potato strips are parfried in ZGTF oil, at a temperature of about 385° F. and a time of about 45 seconds. The thus-parfried potato strips have a solids content of about 35% by weight, and a corresponding moisture content of about 65% by weight. These parfried potato strips are removed from the parfry oil and transported on a conveyor to an air scrubber station wherein excess oil is removed from the strip surfaces by means of high velocity air flow, followed by further conveyance to the water treatment station.

As the parfried potato strips are conveyed through the water treatment station, a water spray is applied to the parfried strips as by means of an overhead array of spray nozzles arranged to apply a spray or mist of water directed downwardly onto the parfried strips. In the preferred form of the invention, this water spray or mist is applied at a relatively cool, preferably ambient temperature within the range of from about 55 to about 85° F. In addition, the preferred water spray flow rate is limited to a relatively slow flow rate sufficient to hydrate the external surfaces of the parfried strips but without significant soak of the applied water spray into the strip interiors. Such minimal flow rate, preferably on the order of about 0.6 pound of water for each 5 pounds of parfried strips, achieves an overall strip weight increase of about 1% to about 11% by weight, without any significant water overspray that would otherwise require collection and disposal or associated processing for recycling.

In a most preferred form of the invention, the ratio of applied water spray to parfried product is less than 1:5, to achieve an overall strip weight increase of about 2% to about 8% by weight.

In one alternative preferred form of the invention, the water spray application rate may be increased to a rate of about 8.5 pounds of water for each 5 pounds of parfried strips, at a relatively cool, preferably ambient temperature within the range of from about 55 to about 75° F. In this variation, the strip weight increase will be about 11% by weight, with substantial water overspray.

The surface-treated parfried potato strips are then advanced with a controlled cool-down time delay to a freezer station, such as a blast freezer when the products are quickly frozen at a temperature of about −20° F. for packaging, shipment and storage.

Upon finish preparation by finish frying the frozen parfried potato strips in hot oil, such as a ZGTF cooking oil, crumb generation within the finish fry oil is dramatically reduced and substantially eliminated. The finish fried products exhibit a substantially optimized balance of high quality appearance, taste and texture characteristics associated by consumers with high quality French fries. In particular, the quality characteristics of the finish fried strips closely emulate the characteristics of French fries that have not been subjected to the post-parfry surface-hydration water treatment step, but wherein such untreated products also exhibit a high rate of crumb generation in the finish fry oil.

To demonstrate the invention, four different batches of French fry products were processed and compared, with the results set forth in Table 1 below (except no salt or TSPP were added to the dip solution). Example 1 comprised a 5 pound batch of shoestring size French fry potato strips prepared and processed in ZGTF oil as described above in the exemplary and preferred form of the invention, with post-parfry water surface hydration spray at room temperature, and a mass flow rate of about 0.6 pound of water with no substantial overspray. Example 2 comprised a similar 5 pound product batch process as described, with post-parfry water surface spray at room temperature, and a mass flow rate of about 8.5 pounds of water with substantial overspray. Example 3 comprised another similar 5 pound product batch processed as described, with post-parfry water surface spray at about 155° F., and a mass flow rate of about 8.75 pounds of water with substantial overspray. Finally, Example 4 comprised a similar 5 pound "control" batch processed similarly but omitting the post-parfry water surface hydration spray. All samples in Table 1 were finish fry prepared for the same time (2 minutes, 45 seconds) at 350° F., using the same amount (1.5 pounds) and in the same style fryer.

TABLE 1

| Ex. | Solids % | Fat % | Water Pick-Up % | Appearance | Aroma | Flavor | Texture | Overall | Crumbs |
|---|---|---|---|---|---|---|---|---|---|
| 1 | 32.2 | 5.8 | 10.6 | 7.2 | 7.0 | 6.6 | 6.8 | 6.8 | Near Zero |
| 2 | 32.6 | 6.2 | 11.2 | 7.3 | 7.2 | 7.0 | 7.1 | 7.0 | Near Zero |
| 3 | 30.2 | 4.7 | 14.9 | 6.8 | 6.8 | 6.3 | 6.3 | 6.4 | Near Zero |
| 4 | 35.3 | 6.2 | N/A | 6.9 | 6.5 | 6.8 | 6.5 | 6.5 | High |

The data set forth in Table 1 indicates that crumb generation in the control product (Ex. 4) is "high". The overall set of sensory characteristics (rated on a scale of 0-10 by a general sensory panel) for the control product (Ex. 4) are generally considered to be of relatively good quality, with optimal or preferred scores typically ranging from about 6.8 to about 7.1. It can be seen that the "aroma" and "texture" scores for the control product (Ex. 4), as well as the overall score, are about 6.5—a score which is somewhat less than the optimal or preferred range of about 6.8 to about 7.1.

By contrast, Ex. 1 (no substantial overspray) yielded an approximate 10.6% increase by weight following the water treatment step. Upon finish fry preparation in a ZGTF oil, crumb generation was reduced to "near zero", yet the sensory characteristics remained within or very close to the optimally preferred range of about 6.8 to about 7.1. Ex. 2 (substantial overspray) yielded a comparatively small increase in weight over Ex. 1 (11.2%) while retaining the sensory characteristics within or very close to the preferred optimal range, and achieving "near zero" crumb generation. By contrast, Ex. 3 (substantial overspray with heated water) yielded a comparatively significant product weight increase (14.9%) accompanied by a significant deterioration in "flavor", "texture", and "overall" sensory scores. Thus, while Ex. 3 also achieved "near zero" crumb generation, the quality of the finish prepared product was significantly poorer than Examples 1 or 2 and fell below the untreated control of Ex. 4.

In accordance with one further aspect of the invention, the post-parfry water treatment step may be used to impart and/or to enhance desirable characteristics to the potato strips, upon finish preparation thereof as by finish frying in hot oil. In this regard, a broad range of water soluble constituents such as flavor additives, texture modifiers, and/or appearance modifying agents may be incorporated into the water applied to the parfried strips at the water treatment station for controllably modifying and/or regulating one or more of these sensory characteristics.

More particularly, flavor additives such as one or more selected water soluble agents may be incorporated into the water used at the water treatment station for imparting and/or enhancing flavor attributes upon finish preparation. Exemplary flavor additives may include, but are not limited to salt, onion, garlic, cheese, barbecue and other selected water soluble flavor constituents, and/or combinations thereof. In one form, the water used at the water treatment station may comprise, in whole or in part, recycled blanch water having various flavor constituents such as salt and the like as well as potato starch constituents entrained therein.

Alternative agents for modifying texture and/or appearance properties of the finished prepared potato strips may also be incorporated into the water used at the water treatment station. By way of example only, such modifying agents may include tetra sodium pyrophosphate (TSPP), sodium acid pyrophosphate (SAPP), dextrin agents such as maltodextrin and others, starches, gums and nutrition enhancers such as tapioca starch, acacia gum, and others. Such modifying agents can be employed to enhance surface texture and/or surface color, and fat levels in accordance with a desired set of finish prepared product attributes.

Alternative antimicrobial agents and the like may be incorporated into the water used at the water treatment station. For example, an antimicrobial agent such as peroxyacetic acid may be used. Anti-yeast or anti-mold agents such as octanoic acid may also be incorporated into the water used at the water treatment station. In general, trace amounts of such agents, up to about 80 ppm, may be employed.

In the preferred form, such agents are added to the water used at the water treatment station for treating the parfried potato strips preferably with little or no water overspray, and preferably wherein the water is provided at a relatively cool temperature such as substantially at room temperature or the like.

In accordance with further aspects of the invention, it will be appreciated that the post-parfry water treatment step may be used to achieve similar benefits in other types of potato products, including but not limited to starch based batter coated and/or wheat-based batter coated potato strips which are batter-coated prior to the parfrying step, and also to formed potato-based products such as parfried potato patty products.

More particularly, by way of further specific example, elongated cut potato strips are blanched and partially dried, generally as previously described herein, followed by surface-coating of the potato strips with a selected aqueous-based batter composition. In a preferred form, the batter-coated strips are conveyed to a parfryer by means of a batter drip belt whereat excess liquid batter drips off the coated strips for recycling. The batter-coated strips are parfried in hot oil, preferably in a two-step sequence wherein the strips are initially parfried in a near mono-layer configuration to set the batter coating in a manner to prevent product clumping, followed by additional batch parfrying. While parfry times and temperatures may vary, a typical first parfry step occurs for about 2-25 seconds at about 360-395° F., and a typical second parfry step occurs for about 20-55 seconds at about 360-395° F. The batter-coated and parfried strips are then subjected to the water treatment step, as previously described, and freezing, resulting in a product which exhibits virtually no crumb generation when finish prepared by frying in hot oil.

Alternatively, formed potato products such as so-called gems are produced from an aggregation of small cut potato chunks, strip, and/or slices which have been previously blanched and partially dried. These small potato pieces are typically cut further into smaller chunks and blended in a mixer with selected dry ingredients such as SAPP, dextrose, spices including but not limited to pepper and salt, and selected starches, gums, and the like. A forming machine, such as a rotary former, is then utilized to produce the individual formed products, such as small spheres or cylinders which are then parfried in hot oil at about 360-390° F. For about 45-85 seconds to achieve a desirable set of flavor, color and texture characteristics. Following the parfry step, the formed potato products may be subjected to the water treatment step, as previously described herein, followed by freezing for shipment and/or storage. Upon finish fry preparation as by finish frying in hot oil, the water-treated formed products exhibit substantially no crumb generation irrespective of the finish fry oil type.

A variety of further modifications and improvements in and to the improved French fry production process of the present invention will be apparent to those skilled in the art. By way of example, the parfried potato products described herein can be frozen promptly after the parfry step, and these frozen potato products can be subjected to the water treatment step as described herein. In this modified process sequence, the surface-applied water appears to thaw a portion of the surface of the frozen products, whereupon the water-treated products are promptly re-frozen with a slightly surface-frosted appearance. Upon subsequent finish preparation as by finish frying, the thus-treated products yielded a high quality set of flavor, texture and color attributes, in combination with substantial elimination of crumb generation.

Accordingly, no limitation on the invention is intended byway of the foregoing description, except as set forth in the appended claims.

What is claimed is:

1. A process for parfrying and freezing potato products, wherein generation of crumbs upon finish fry preparation of the potato products is substantially eliminated, said process comprising the steps of:
   blanching potato products in hot water or steam;
   parfrying the blanched potato products a single time in hot zero grams Trans Fat (ZGTF) oil at a frying temperature to produce parfried potato products having a moisture content greater than about 60% by weight;
   applying a water-based spray to the once-parfried potato products at a water temperature substantially less than about 155° F., substantially without overspray, prior to subsequent frying, to surface-hydrate the potato products and to achieve an overall potato product weight increase of from about 1% to about 11% by weight;
   freezing the once-parfried potato products; and
   finish fry preparation of the once-parfried potato products in hot oil at a frying temperature.

2. The process of claim 1 wherein the potato products comprise French fry potato strips.

3. The process of claim 2 including the step of coating the potato strips with a liquid batter prior to said parfrying step.

4. The process of claim 1 wherein the potato products comprise formed potato products.

5. The process of claim 1 including the step of freezing the potato products subsequent to said water applying step.

6. The process of claim 1 wherein said water applying step comprises applying water to the parfried potato products at a flow rate of up to about 8.5 pounds water per 5 pounds of parfried potato products.

7. The process of claim 1 wherein the oil for finish fry preparation of the potato products comprises a zero grams Trans Fat (ZGTF) oil.

8. The process of claim 1 wherein said water applying step comprises applying water having at least one flavor constituent therein.

9. The process of claim 8 wherein said at least one flavor constituent is selected from the group consisting essentially of salt, onion, garlic, cheese, barbecue, selected water soluble flavor constituents, and combinations thereof.

10. The process of claim 1 wherein said water applying step comprises applying water having at least one texture modifying agent therein.

11. The process of claim 10 wherein said at least one texture modifying agent is selected from the group consisting essentially of tetra sodium pyrophosphate (TSPP), sodium acid pyrophosphate (SAPP), dextrin-based agents, starches, and gums.

12. The process of claim 1 wherein said water applying step comprises applying water having at least one antimicrobial agent therein.

13. The process of claim 1 wherein said water applying step comprises applying water having at least one anti-mold agent therein.

14. The process of claim 1 wherein said water spray step comprises applying the water-based spray at a water temperature of less than about 85° F.

15. The process of claim 1 wherein said water spray step comprises applying the water-based spray at a water temperature of at least about 55° F.

16. The process of claim 1 wherein said water spray step comprises a misting step.

17. The process of claim 1 wherein said water spray step achieves an overall strip weight increase of from about 2% to about 8% by weight.

18. The process of claim 1 wherein said water spray step applies water to the parfried potato products at a flow rate of less than about 1 pound water per 5 pounds of parfried potato products.

19. The process of claim 1 further including the step of applying an air flow to the parfried potato products at a velocity sufficient to scrub excess oil from the parfried potato products, prior to said water spray step.

20. The process of claim 1 wherein said parfrying step produces parfried potato products having a moisture content of about 65% by weight.

* * * * *